Tonic and Diatonic Mutation-Scale.

No. 121,066. Patented Nov. 21, 1871.

Witnesses
W. Burris
J. F. Olmstead

Inventor
James H. Scott
By Attorney
G. B. Forbes

UNITED STATES PATENT OFFICE.

JAMES H. SCOTT, OF KICKAPOO, ILLINOIS.

IMPROVEMENT IN TONIC AND DIATONIC MUTATION SCALES.

Specification forming part of Letters Patent No. 121,066, dated November 21, 1871; antedated November 2, 1871.

*To all whom it may concern:*

Be it known that I, JAMES H. SCOTT, of Kickapoo, in the county of Peoria and in the State of Illinois, have invented a Tonic and Diatonic Mutation Scale; and I do hereby declare that the following is a full, clear, and exact description thereof, reference being had to the annexed drawing making a part of this specification, in which like letters of reference refer to like parts, and in which—

Figure 1:
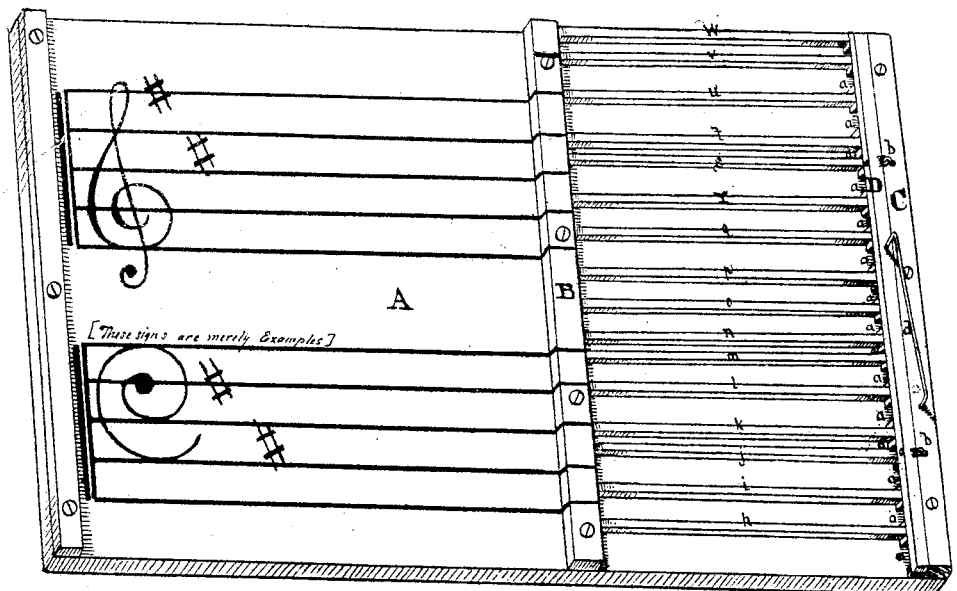
Figure 2:
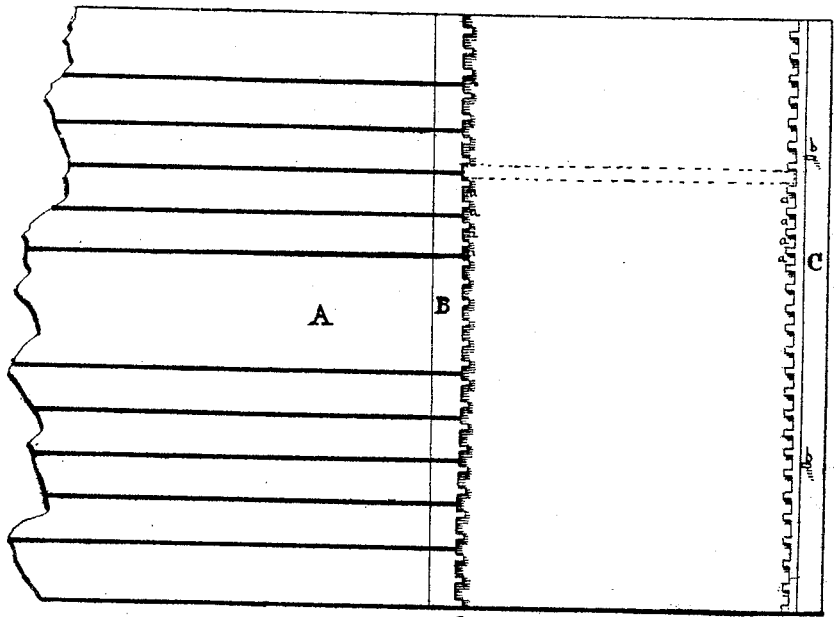
Figure 3:
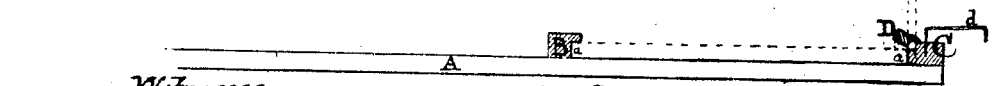

Figure 1 represents a perspective view; Fig. 2, plan, with strip or folding holder D removed to show the notches, and the upper part of strip B also removed for the same purpose; Fig. 3, sectional view across the interval between the strips B and C.

Like letters in the different figures of the drawing indicate like parts.

The object of my invention is to simplify and illustrate more clearly the diatonic scale and its various transpositions in music; and to enable others skilled in the art to understand the same I will proceed to describe its construction and operation.

A represents a board ruled with the musical staff. The "signs" shown in the drawing are merely for examples. B C are two upright strips, firmly fastened to the board, and are immovable. Their use is simply to receive and support the horizontal removable bars $h\ i\ j\ k$, &c., and for this purpose they have notches $a\ a\ a$, &c., cut out at intervals assumed to be equal to one-half step or semitone. These intervals or distances must correspond with the lines and spaces in the staff on the left, there being either two or four intervals on the right for each line and space together on the left. This necessity exists only with reference to the starting point of the operation by the teacher or pupil, as there is no necessary correspondence between the horizontal bars on the right and the staff (five lines and four spaces) on the left after the key-note has been designated by inserting its corresponding horizontal bar. The hinged strip D, attached to the inner edge of the strip C, is merely to secure the ends of the bars after changing their places, and is kept in place by means of the spring $d$, which presses the strip down and keeps it shut.

The operation is as follows: In teaching the scales the removable horizontal bars $h\ i\ j\ k$, &c., may be adjusted by the pupil so as to correspond with the diatonic scale, thus: major, from do, the key-note, to re, ascending two half steps; re to mi, two half steps; mi to fa, one-half step, &c. Also, ascending from do, the key-note, the proper succession of steps and half steps is to be observed. If the recitation is on the minor scale, the use of the horizontal bars are in like manner to be adapted to its peculiarities, representing always to the eye, by the relative distances apart of the horizontal bars, the relative position of the steps and half steps, or tones and semitones, in the scale under consideration.

To vary the exercises the teacher may arrange the removable bars $h\ i\ j\ k$, &c., to a given scale and call upon the pupils to define it. In teaching the transpositions of the scale the teacher may designate the key by writing in the proper place the signature of the flats or sharps, as witness the two sharps in the diagram, then call upon the pupils to locate the key-note and arrange a horizontal bar on the right corresponding with the position of the key-note on the staff, as with D in the diagram, and from this arrange all the horizontal bars, giving the proper succession of the steps and half steps, ascending and descending. To vary the exercises the teacher may prepare the bars, and the pupils may designate the proper transpositions, writing the requisite flats or sharps on the left.

Having thus fully described my invention, what I claim therein as new, and desire to secure by Letters Patent, is—

1. The bars B C, with notches $a\ a$ to facilitate the removal and adjustment bars $h\ i\ j\ k$, &c., in combination with the musical staff A, substantially as and for the purpose set forth.

2. The bar B, provided with spring $d$ for retaining hinged strip D over the bars $h\ i\ j\ k$, &c., when adjusted in the proper notches $a\ a$, in combination with the musical staff A, substantially as and for the purpose set forth.

In testimony that I claim the foregoing I, JAMES H. SCOTT, have hereunto set my hand this 8th day of November, 1870.

JAMES H. SCOTT.

Witnesses:
 EDMUND THURLOW,
 HENRY W. WELLS.

(102)